United States Patent [19]

Eisenstadt

[11] 3,946,121

[45] Mar. 23, 1976

[54] CALORIE-FREE SWEETENER WITHOUT SOURNESS

[75] Inventor: Marvin E. Eisenstadt, Neponsit, N.Y.

[73] Assignee: Cumberland Packing Corporation, Brooklyn, N.Y.

[22] Filed: Aug. 8, 1974

[21] Appl. No.: 495,785

[52] U.S. Cl. ................................ 426/548; 426/804
[51] Int. Cl.$^2$ .......................................... A23L 1/236
[58] Field of Search ........... 426/213, 217, 191, 548, 426/804

[56] References Cited
UNITED STATES PATENTS

| 3,285,751 | 11/1966 | Kracanek | 426/217 |
| 3,677,770 | 7/1972 | Witzel | 426/217 |
| 3,684,529 | 8/1972 | Liggett | 426/217 |
| 3,743,518 | 7/1973 | Eisenstadt | 426/217 |

FOREIGN PATENTS OR APPLICATIONS

| 1,601,716 | 10/1970 | France | 426/217 |
| 1,268,948 | 5/1968 | Germany | 426/217 |

Primary Examiner—Norman Yudkoff
Assistant Examiner—Curtis P. Ribando
Attorney, Agent, or Firm—Steinberg & Blake

[57] ABSTRACT

The invention relates to non-caloric saccharine sweetening compositions using only saccharine as the artificial sweetener, with the undesired bitter aftertaste of the saccharine being eliminated while avoiding sourness present in other calorie-free sweetening compositions. This is accomplished according to the invention by a composition of saccharine, glucono delta lactone and an edible bicarbonate.

4 Claims, No Drawings

CALORIE-FREE SWEETENER WITHOUT SOURNESS

BACKGROUND OF THE INVENTION

The use of artificial sweeteners in place of sugar for the reduction of caloric intake, for medical reasons and for dietary reasons, is well known. The most common artificial sweeteners are the saccharines and the cyclamates.

Both of these groups of artificial sweeteners are much sweeter than sugar and have no caloric value. However, both groups of substances suffer from the disadvantage of leaving bitter aftertaste in the mouth of the user, and prior to the ban on cyclamates, saccharine and cyclamate have been used together in order to lower the degree of bitter aftertaste of the sweeteners. Since the ban on the cyclamates, and due to the fact that the saccharines have a relatively high degree of bitter aftertaste, it has become much more difficult to provide artificial sweetener compositions without any bitter aftertaste.

I have previously described a composition of saccharine, lactose and cream of tartar for achieving satisfactory sweetening using saccharine alone as the artificial sweetener, without bitter aftertaste. However, such a product contains calories because of the presence of lactose and in fact a sweetening composition which is the equivalent in sweetness to 2 teaspoons of sugar contains about 3 calories. While this is of course extremely low as far as caloric content is concerned, 3 calories are undesirable, particularly in the case of diabetics who might use large amounts of sweeteners and who would not wish to upset their carbohydrate intake in any way. In addition, lactose is also known as milk sugar, and therefore persons of orthodox Jewish faith cannot use this composition in conjunction with meat products.

In addition I have previously described a composition of saccharine, glucono delta lactone, sodium gluconate and/or potassium gluconate and cream of tartar (potassium bipartrate). This composition avoids the bitter aftertaste of the saccharine, is completely calorie free and also can be used with dairy or meat products by persons of the orthodox Jewish faith.

However, it has been found that the composition can cause milk, for example in coffee to curdle, and also that the use thereof gives rise to a slight sour aftertaste.

Generally speaking, in accordance with the present invention, a composition is provided of saccharine, glucono delta lactone and an edible bicarbonate. This composition not only avoids the bitter aftertaste of the saccharine in a calorie-free product, but it is also free of sourness and does not cause milk to curdle.

SUMMARY OF THE INVENTION

It is accordingly a primary object of the present invention to provide a sweetening composition which contains only a saccharine as the artificial sweetener but which does not have any bitter aftertaste of the saccharine, has no calories, has no sourness, does not curdle milk and can even be used by persons of orthodox Jewish faith with either dairy or meat products.

It is yet a further object of the present invention to provide a composition of a saccharine, glucono delta lactone and an edible bicarbonate which composition has no undesired bitter aftertaste or sourness and can be used with all types of food while providing only a sweetening effect closely approximating that of natural sugar.

It is another object of the present invention to provide a calorie-free, sodium-free sweetening composition which can be used by all persons, including diabetics and those with high blood pressure and which nevertheless has no undesired bitter aftertaste or sourness.

Other objects and advantages of the present invention will be apparent from a further reading of the specification and of the appended claims.

In accordance with the present invention, the saccharine artificial sweetener is mixed with glucono delta lactone and an edible bicarbonate in such proportions that the composition contained between about 2–10% of saccharine, (preferably about 6%), 2–14% of bicarbonate (preferably about 7%) and 76–96% of glucono delta lactone (preferably about 87%). All percentages and parts herein are by weight. When these components are used in these proportions, the most desired effect of sweetness approaching that of natural sugar without any bitter aftertaste or any sourness and without any undesired effect on the food or beverage to which the sweetening composition is added are obtained.

The term "saccharine artificial sweetener" as used throughout the specification and claims of this case is meant to refer to saccharine itself and the salts thereof such as sodium saccharine, potassium saccharine, calcium saccharine, etc.

The term "edible bicarbonate" as used herein refers to the bicarbonate salts, such as sodium bicarbonate, potassium bicarbonate and sodium bicarbonate.

According to a preferred embodiment of the present invention the composition provided is not calorie free but is also sodium free, and in such composition it is preferred to use potassium or calcium saccharine, preferably calcium saccharine, and it is preferred to use potassium bicarbonate or ammonium bicarbonate, preferably potassium bicarbonate.

It should be noted that all of the components of the composition of this invention must be used in combination in order to achieve the desired results. Thus, the use of glucono delta lactone alone with the saccharine artificial sweetener results in a composition which curdling of milk, possible discoloration of the beverages such as coffee or tea, and also exhibits a sourness.

On the other hand, the use of the edible bicarbonate alone with the saccharine artificial sweetener has no effect whatsoever in masking the bitter aftertaste of the saccharine. It is only by combining the edible bicarbonate with the glucono delta lactone that it is possible to completely mask the bitter aftertaste of the saccharine while at the same time avoiding disadvantages of curdling of milk, sourness, etc.

DESCRIPTION OF PREFERRED EMBODIMENTS

The following examples are given to further illustrate the present invention. The scope of the invention is not, however, meant to be limited to the specific details of the examples.

EXAMPLE 1

25.5 pounds of glucono delta lactone, 1.8 pounds of calcium saccharine and 2.1 pounds of potassium bicarbonate are thoroughly and uniformly mixed.

The resulting mixture is many times as sweet as natural sugar so that a small amount thereof can be used in place of sugar to give a sweetening effect without providing any calories. Approximately 0.6 gm of the composition will give the sweetening effect of two teaspoons of sugar. This composition can be used to sweeten beverages or in cooking, in all quantities even to highly sweeten beverages without causing any bitter aftertaste, without sourness, and without adversely affecting the taste of the food or beverage to which it is applied.

In addition, the above composition may be freely used by persons with high blood pressure because it is totally sodium free.

EXAMPLE 2

A sweetening composition is prepared as in Example 1, however using sodium saccharine and sodium bicarbonate. The taste effect of the composition is the same as in Example 1, however because of the sodium content it should be used only with care by persons having high blood pressure.

EXAMPLE 3

A sweetening composition is prepared as in Example 1, however using 7.6 pounds of glucono delta lactone, 1.0 pounds of calcium saccharine and 1.4 pounds of potassium bicarbonate.

Approximately 1.36 gms. of the above product gives the sweetening power approximating that of two teaspoons of sugar. The composition can otherwise be used in the same manner as the composition of Example 1.

EXAMPLE 4

A sweetening composition is prepared as in Example 1, however using 96 pounds of glucono delta lactone, 2 pounds of calcium saccharine and 2 pounds of potassium bicarbonate.

Approximately 1.8 gms. of the above product is used to obtain the sweetening equivalent of 2 teaspoons of ordinary sugar.

Any of the above compositions may be used for the sweetening of beverages, in baking, preparing cooked fruits, in cooking, in making candies, etc.

While the invention has been described in particular with respect to specific combinations of the components of the composition, it is to be understood that variations and modifications thereof can be made.

What is claimed is:

1. A sweetening composition consisting essentially of between about 2–10% by weight of a saccharine artificial sweetener, about 2–14% by weight of an edible bicarbonate, and about 56–96% by weight of glucono delta lactone.

2. Composition according to claim 1 wherein said saccharine artificial sweetener is present in an amount of about 6% by weight, said edible bicarbonate is present in an amount of about 7% by weight, and said glucono delta lactone is present in an amount of about 87% by weight.

3. Composition according to claim 1 wherein said saccharine artificial sweetener is selected from the group consisting of potassium saccharine and calcium saccharine and wherein said edible bicarbonate is selected from the group consisting of potassium bicarbonate and ammonium bicarbonate, so that said composition is sodium-free.

4. Composition according to claim 1 wherein said saccharine artificial sweetener is calcium saccharine and wherein said edible bicarbonate is potassium bicarbonate.

* * * * *